MAGNETIC CORE HALF ADDER

Filed May 22, 1956 2 Sheets-Sheet 1

*INVENTOR.*
EDWIN W. BAUER
*BY* John E. Hougherty Jr
AGENT

United States Patent Office 2,868,451

Patented Jan. 13, 1959

2,868,451

MAGNETIC CORE HALF ADDER

Edwin W. Bauer, Poughkeepsie, N. Y., assignor to International Business Machines Corporation, New York, N. Y., a corporation of New York Application May 22, 1956, Serial No. 586,539

17 Claims. (Cl. 235—61)

The present invention relates to circuitry for performing logical functions, and more particularly to binary adder circuitry which utilizes a novel magnetic structure having a plurality of magnetic circuit paths.

Binary half adders, which are two input and two output devices, and binary full adders, which are three input and two output devices, are basic components in most present day computers and many circuits which perform the logical functions of these devices are now well established in the art. Heretofore a large number of these circuits have utilized vacuum tubes and crystal diodes as the means for carrying out the required logical switching functions, and recently such circuits have been developed which utilize magnetic cores as the primary switching element. It is of course a prime consideration in the development of such circuitry to achieve an economy in both the number and size of the components utilized. The present invention is involved with the furthering of this consideration in that it has a primary object the provision of logical circuitry, such as is required to perform the logical functions of binary half and full adders, using a minimum of component parts.

A more specific object of the present invention is to provide a circuit, capable of performing the logical functions of a half adder, which circuit utilizes a novelly constructed magnetic element as the primary functional switching component.

A further object is to provide a circuit which utilizes two such novelly constructed switching elements to perform the logical functions required of a full adder.

These objects are achieved, as will be illustrated in the description of the preferred embodiment herein disclosed, by utilizing as a basic circuit element a single magnetic structure which is capable of performing both the Exclusive Or and And logical functions required of a binary half adder. The geometry of the novel magnetic circuit element is such as to provide three basic magnetic circuit paths which are utilized in the performance of these logical functions. The first of these magnetic circuits, which may be called the sum circuit, is linked by both input windings and also by the sum output winding for the system. The second and third magnetic circuits are each linked by a different one of the aforesaid input windings and each includes a portion which is in parallel magnetic circuit relationship with the portion of the first magnetic circuit which is embraced by the sum output winding. The second and third magnetic circuits have a common leg which is embraced by a carry output winding and each of these circuits is of greater length than the first circuit and thus each offers a higher reluctance to the magnetomotive force applied by the input windings than does the first magnetic circuit. In operation the first magnetic circuit performs the required Exclusive Or function, in that the input windings are opposed and produce a change in flux in that part of the circuit which is linked by the sum output winding only when one or the other of the input windings is energized independently. When either of the input windings is energized independently, the second or third magnetic circuit, according to which input winding is energized, is also subjected to a magnetomotive force but, due to the longer length of these circuits compared to the first or sum circuit, the voltage output then induced in the carry winding is not appreciable. When both inputs are energized coincidently, the leg of the first or sum magnetic circuit, to which the sum output winding is linked, is subjected to two equal and opposite magnetomotive forces and there is no flux change effected in this leg and thus no output is induced in the sum output windings. In such a case the only flux paths available are the parallel portions of the second and third magnetic circuit paths and the construction is such that the flux change caused by the energization of each input winding is, in the common leg of these circuits, in the same direction causing an appreciable output to be induced in the carry output winding.

Two such circuits may be linked together to form a full binary adder by applying two of the three inputs to one such magnetic circuit element, and applying the sum output of this element and the third input to a second such magnetic circuit element. The sum output of the full adder is taken off the sum output winding linking the sum magnetic circuit of the second element and the carry output is taken from the carry winding of each element.

Thus, another object of this invention is to provide magnetic circuitry which utilizes parallel magnetic circuit paths having different reluctances in performing logical circuit functions.

A further object is to provide such circuitry in which the desired reluctance values are achieved by constructing the various circuit paths of the same material but with different lengths and cross sectional areas.

Other objects of the invention will be pointed out in the following description and claims and illustrated in the accompanying drawings, which disclose, by way of example, the principle of the invention and the best mode, which has been contemplated, of applying the principle.

Figure 1:
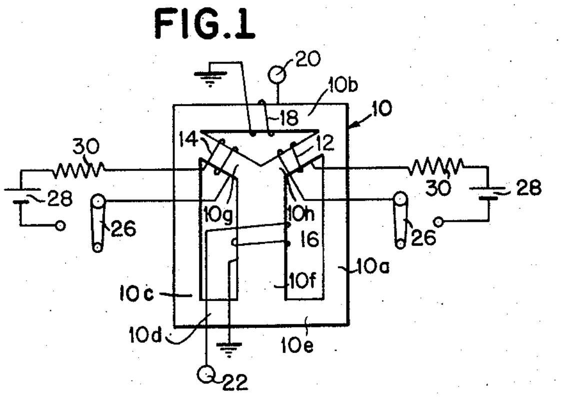
Figs. 1 and 1A are diagrammatic views of different embodiments of the novel magnetic structure of the invention, together with the windings associated therewith to constitute circuits capable of performing the logical functions required of a binary half adder.

There is shown in Fig. 1 one embodiment of the novel magnetic structure of the subject invention with the various input and output windings associated therewith to constitute a device capable of performing the logical functions required of a binary half adder. The magnetic structure, generally designated 10, includes five peripheral legs or portions designated 10*a*, 10*b*, 10*c*, 10*d* and 10*e* and three inner legs 10*f*, 10*g* and 10*h*. These portions form three basic magnetic circuit paths which are linked by the input and output windings. The first of these magnetic ciriuit paths, which is here termed the sum circuit, includes the legs 10*g*, 10*h* and 10*b* and is linked by windings 12 and 14 to which the binary information inputs to be added are applied, and a sum winding 18 from which is taken the sum output of the binary addition of the information inputs applied to windings 12 and 14. The second magnetic circuit path includes the legs 10*a*, 10*e*, 10*f* and 10*h* and is linked by the input winding 12 and a carry output winding 16. The third magnetic circuit consists of legs 10*c*, 10*d*, 10*f* and 10*g* and is linked by the input winding 14 and the carry output winding 16. Other magnetic circuit paths which influence the operation of the system will be indicated in the following detailed description.

In operation the first, or sum magnetic circuit, functions as an Exclusive Or circuit and the parallel portions of the second and third magnetic circuits, having common leg 10*f*, function as an And circuit to produce the proper outputs on windings 16 and 18 in response to the inputs applied to windings 12 and 14. When either of the input windings 12 or 14 is energized independently, a flux change in the first magnetic circuit is effected which flux change causes an output to be induced in the sum output winding 18. The input windings 12 and 14 are wound in opposite sense relationship so that, when energized coincidently, the sum magnetic circuit is subjected to two equal and opposite magnetomotive forces. Thus, the flux in this circuit remains unchanged and no output is induced in the sum output winding 18.

Figure 2A:
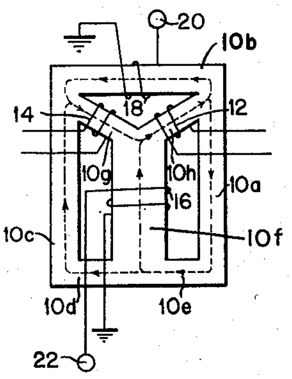
Figs. 2A, 2B and 2C are diagrams of the magnetic element of Fig. 1 illustrating the direction of the flux changes effected in certain flux paths when the input windings are energized.
Figure 2B:
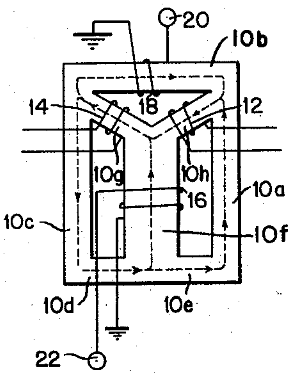
Figure 2C:
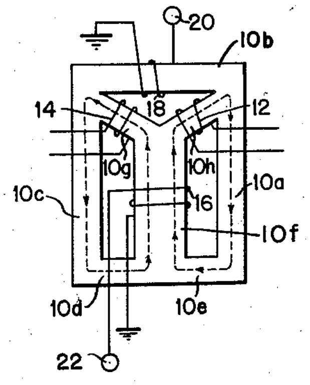
Figure 3A:
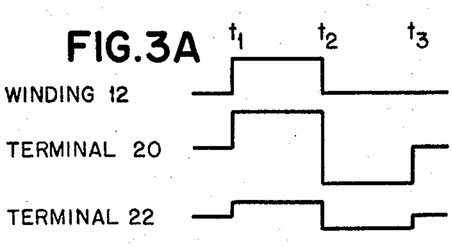
Figs. 3A, 3B and 3C are diagrammatic illustrations of the pulses applied to and developed at different points in the circuit of Fig. 1.
Figure 3B:
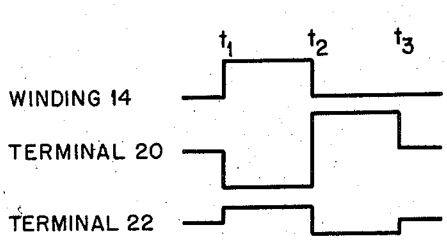
Figure 3C:
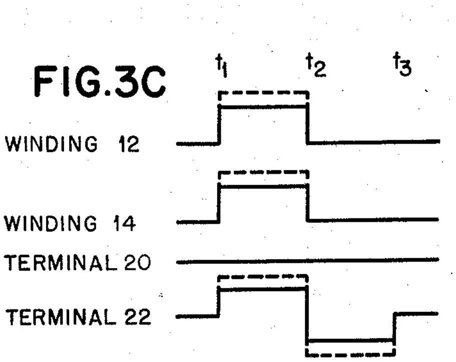

The direction of flux change and the output pulses thereby induced for various combinations of input pulses are illustrated in Figs. 2A, 2B, 2C, 3A, 3B and 3C. In Fig. 2A, there is shown the direction of flux change initially produced as the result of applying a current pulse, from $t_1$ to $t_2$ time, to winding 12 by closing and opening a switch 26, shown in Fig. 1 to be in the input circuit which includes that winding. It should be here noted that the pulse shapes shown in Figs. 3A, 3B and 3C are primarily to illustrate the polarity, time, and in some cases, relative magnitude of the pulses applied to and developed at the various circuit points, and for this reason liberty has been taken in showing the pulse shapes to be essentially square. The pulse shapes actually developed are, of course, dependent upon many factors, a primary one of which is the material utilized in the core structure. Though it is possible to use material having a relatively square hysteresis loop and thus a high ratio of remanent flux density to saturable flux density, it is preferable especially where larger signal outputs are desired to use a material having a magnetic characteristic of the general form of the B—H curve shown in Fig. 4. As can be seen from the values of remanent flux density $B_r$ and saturable flux density $B_s$ which are graphically depicted in that figure, the ratio $B_r/B_s$ is relatively low. Materials of this nature having a $B_r/B_s$ ratio less than 0.5 and whose hysteresis loops exhibit large linear portions having essentially uniform slopes are more suitable for application in the novel structure of the subject invention.

Referring again to Figs. 2A and 3A, it can be seen that the application of the current pulse applied at $t_1$ time to the input winding 12 effects a flux change which is counterclockwise in the sum circuit which includes legs 10*h*, 10*b* and 10*g* and is clockwise in the carry circuit which includes portions 10*h*, 10*a*, 10*e* and 10*f*. Another magnetic circuit is also subjected to the magnetomotive force effected by the application of the pulse to input winding 12 and this circuit is in parallel to leg 10*f* and includes portions 10*d*, 10*c* and 10*g*. The total flux change produced by the magnetomotive force applied to these circuits is dependent upon the reluctance of each circuit and their manner of connection. The sum circuit and the entire carry circuit, which includes the parallel circuit described above, are in parallel and the total flux is split between these circuits in accordance with the reluctance each offers to the applied magnetomotive force. The geometry of the structure 10 is such that the cross sectional area of each of the legs with the exception of the leg 10*f* is the same. Leg 10*f* has a cross sectional area approximately twice that of the other legs. The reluctance of each of the legs 10*a* through 10*f* is directly proportional to its length and inversely proportional to its cross sectional area. Thus, it becomes obvious that by properly constructing the magnetic circuit element any desired split of the total flux change effected by a magnetomotive force applied to the parallel circuit paths may be accomplished. In the embodiment herein disclosed by way of illustration the construction is such that the reluctance of the sum circuit path is approximately one-half of the reluctance of the entire carry circuit path. Since the voltage induced in the output windings is proportional to the total change in flux in a unit of time, the voltage induced in the sum output winding 18 is roughly twice that which is induced in the carry winding 16. Note should be made of the fact that the reluctance of the carry leg 10*f* is much less than that of the parallel circuit including legs 10*d*, 10*c* and 10*g* and thus, the greatest part of the flux change in the entire carry circuit is channelled in the carry leg. Thus, as shown in Fig. 3A, the application of a current pulse at $t_1$ time causes pulses of the polarity shown to be developed at the sum and carry output terminals 20 and 22, respectively. Upon the termination of the input current pulse a flux change in the opposite direction is effected and voltage pulses of opposite polarity are developed at these output terminals.

The operation of the circuitry is similar when a current is applied at a time $t_1$ to the other input winding 14. The direction of flux change is then as indicated in Fig. 2B and the polarity and timing of the pulses developed at the output terminals are as shown in Fig. 3B. In this case the reluctance offered to the input magnetomotive force is the reluctance of the sum circuit in parallel with that of the carry circuit which includes legs 10*c*, 10*d*, 10*f* and in parallel with carry leg 10*f*, the legs 10*e*, 10*a* and 10*h*. The structure is symmetrical so that the flux will split in the same proportions as when input winding 12 is energized and as a result the magnitude of the output pulses developed at terminals 20 and 22 is the same as when input winding 12 is energized. However, winding 14 is wound in an opposite sense to winding 12 and the flux change effected in the sum circuits is, upon the application of a pulse to winding 14 at $t_1$ time, in a direction opposite to the direction of flux change effected when winding 12 is energized. This difference in the direction of flux change in the sum circuit is illustrated in Figs. 2A and 2B, the former figure showing the direction of flux change at $t_1$ time when winding 12 is energized and the latter figure showing the direction of flux change when winding 14 is energized. These figures also show that when winding 14 is energized. These figures also that the direction of flux change in the carry leg 10*f* is the same in either case. Thus, as illustrated in Figs. 3A and 3B, the sum output pulse developed from $t_1$ to $t_2$ time at the sum output terminal 20, when input winding 12 is energized, is of opposite polarity to the pulse developed when winding $P_2$ is energized and the small pulse developed at carry output terminal 22 is of the same polarity for an input on either winding.

Figs. 2C and 3C illustrate the magnetic flux direction and output pulses developed as a result of simultaneously closing switch 26 in the input circuit including winding 12 and a similar switch 26 in the input circuit including winding 14, to coincidently apply current pulses to both windings at time $t_1$. Since the windings 12 and 14 are wound in an opposite sense, the magnetic material in sum output leg 10*b* is subjected to magnetomotive forces of equal magnitude and opposite direction and there is thus no magnetic gradient across this leg and no flux change is there effected. Similarly, since there is a magnetomotive force applied to cause a flux change in each of the magnetic carry circuits in the direction shown, which flux change is in the same direction and is thus additive in carry leg 10*f*, the previously described circuits in parallel with leg 10*f* in each carry circuit are not available and all of the flux change effected by energizing winding 12 is confined to the carry circuit including legs 10*h*, 10*a*, 10*e* and 10*f* and all of the flux change effected by energizing winding 14 is confined to the carry circuit including legs 10*g*, 10*c*, 10*d* and 10*f*. The entire flux change effected as a result of coincidently energizing windings 12 and 14 is confined to the two carry circuits and the flux change in each is additive in the carry leg 10*f* which is linked by the carry output winding 16. Thus, when both input windings are coincidently energized, as is illustrated in Fig. 3C, no output appears at sum output terminal 20 and an appreciable output is developed at output terminal 22.

Figure 4:
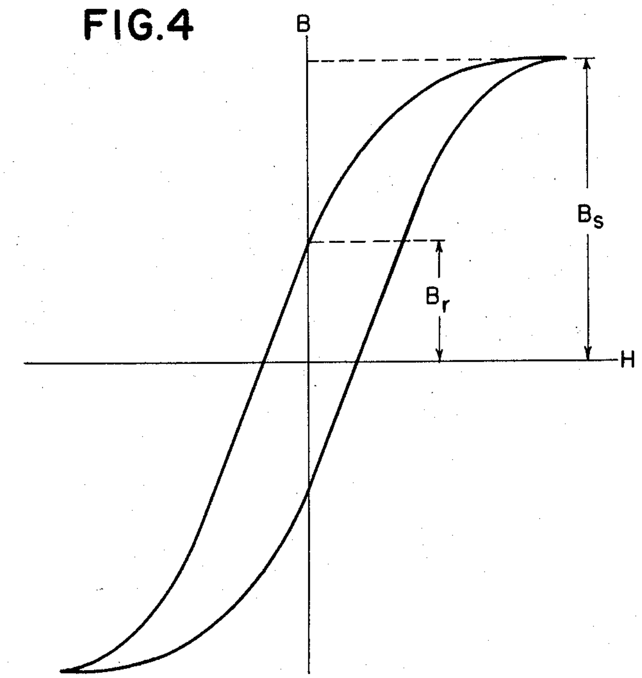
Fig. 4 is a diagram of a hysteresis loop for a material particularly suitable for use in the structure of the magnetic element of the present invention.

There is a difference in the magnitude of the output developed at terminal 22 according to whether the input windings 12 and 14 are voltage driven or current driven. When the resistors 30 have a high ohmic value relative to the impedance offered by the windings 12 and 14 to the potential applied by the batteries 28, the windings may be considered to be current driven since the current caused to flow in these windings upon the closing of switches 26 is essentially the same regardless of the total reluctance of the magnetic paths linked by the windings. Thus, the magnetomotive force applied by each winding is the same for exclusive energization as for coincident energization. When either winding is energized independently, all of the flux change effected in the associated carry circuit is not confined to carry leg 10*f*, there being some flux change in the circuit in parallel with that leg as above described. When both of the input windings are energized coincidently, all of the flux generated by the resulting magnetomotive force applied to each circuit passes through leg 10*f* and thus the flux change in that leg, upon coincident energization of windings 12 and 14, is more than twice the flux change effected in the leg when one or the other of the windings is energized independently. This ratio of the full output flux, generated in the carry leg when both input windings are coincidently energized, to the disturb flux generated when one or the other is energized exclusively will, of course, vary both according to the slope of the portion of the hysteresis loop being traversed, and according to the reluctance of leg 10*f* compared to that of the legs 10*d*, 10*c* and 10*g*, or 10*e*, 10*a* and 10*h* which are in parallel therewith. The above mentioned ratio in excess of 2 to 1 is obtainable with an element having a geometric configuration such as is shown in Fig. 1 and made of a material having a hysteresis loop such as is shown in Fig. 4. The input and output pulses developed when the input windings are current driven are shown in Fig. 3C in full lines, the current pulses applied to the windings 12 and 14 being of the same magnitude when the windings are energized coincidently as when either is energized exclusively and the magnitude of the output pulse developed at carry terminal when both windings are energized coincidently being approximately twice that of the disturb pulses shown in Figs. 3A and 3B.

The dotted pulse forms shown in Fig. 3B are indicative of increase in the magnitude of these pulses when the input windings 12 and 14 are voltage driven. This is essentially the case where the resistors 30 have a relatively low ohmic value and thus the current flow in the input circuits is primarily controlled by the impedance offered by the windings 12 and 14 to the potential applied by the batteries 28. This impedance offered by these coils is inversely proportional to the total reluctance of the magnetic circuit paths circuit and the associated carry circuit including the portion in parallel with leg 10*f*. When the windings are pulsed coincidently the reluctance is essentially that of the associated carry circuit excluding the portion of the other carry circuit in parallel with leg 10*f*. The reluctance of either of the carry circuits alone is, of course, greater than the parallel combination of either carry circuit and the sum circuit and also greater than that of either carry circuit having a portion of the other carry circuit in parallel with leg 10*f*. Thus, when the windings 12 and 14 are energized coincidently, the reluctance of the linked circuit for each is greater than when energized independently and as a result, the inductance and thus the impedance offered by the input windings to the potential supplied by batteries 28 is less when the windings are pulsed coincidently. This lower value of impedance allows a larger current flow through the windings, which increased current flow causes the magnetic circuits linked by the windings to be subjected to greater magnetomotive force, thereby generating a larger flux change in the carry circuit, and in particular in carry leg 10*f*. Thus as is shown by the dotted representation in Fig. 3C, the full output pulse developed at terminal 22 is appreciably larger when the input windings are voltage driven. It should here be noted that the relative values shown in Figs. 3A, 3B, 3C of disturb to full output pulses at terminal 22 and the relative magnitude of these pulses to the pulses developed at terminal 20 are illustrative only and can be varied by varying the configuration of the magnetic element 10, the number of windings linking the various legs, or as illustrated above the impedance characteristics of the input energizing circuits.

Figure 1A:
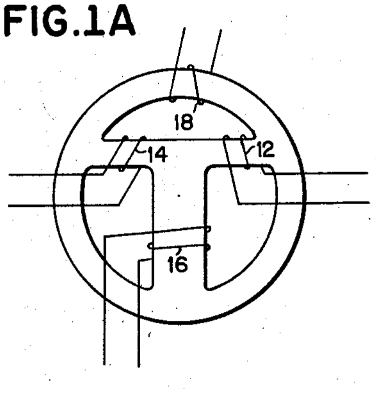

Fig. 1A shows a further embodiment of the invention which also utilizes the varying reluctances of the different magnetic circuit paths in performing the logical functions of a half adder and differs from the embodiment of Fig. 1 only in the configuration of the structure.

Figure 5:
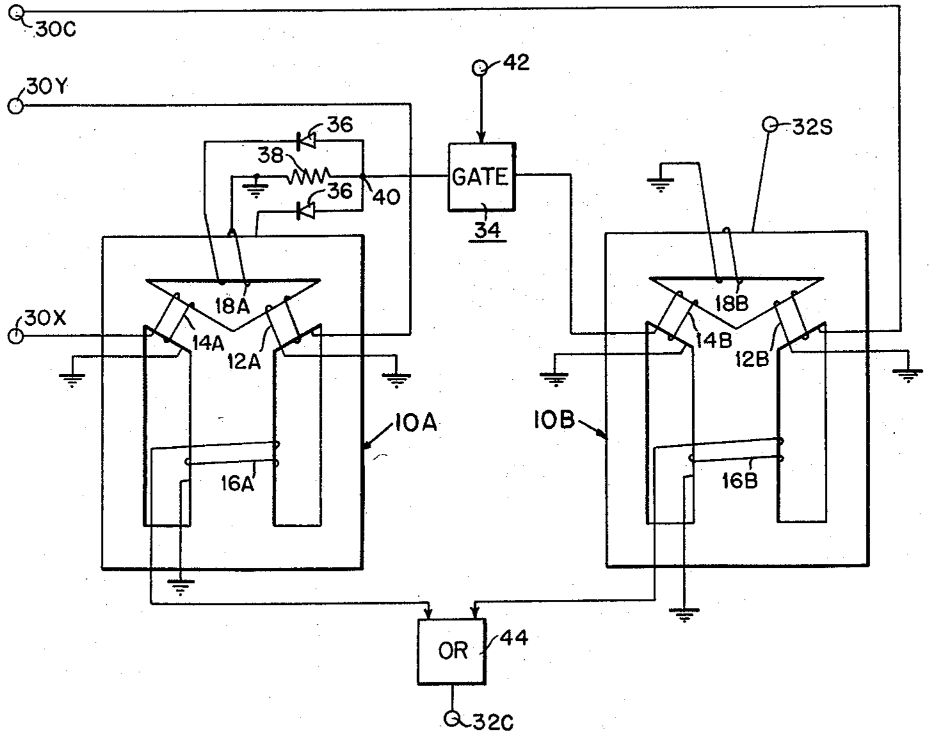
Fig. 5 is a diagrammatic illustration of a manner of connecting two of the novel magnetic elements of the present invention to constitute a full adder.

There is shown in Fig. 5 the manner in which two half adders incorporating the principles of the invention may be connected to constitute a full adder. The structure and geometry of the two magnetic elements 10A and 10B is similar to that described above with reference to Fig. 1. Input information to be combined by the full adder of Fig. 5 is applied to the terminals designated 30S, 30Y and 30C, the sum output for the adder is developed at terminal 32S and the carry output at terminal 32C. According to the rules of binary addition, it is necessary that an output be developed at sum output terminal 32S and no output be developed at carry output terminal 32C when an input pulse is applied exclusively to any one of the terminals 30X, 30Y or 30C; that an output be developed at carry output terminal 32C and no output developed at the sum output terminal 32S when any two of the input terminals are pulsed coincidently; and that an output be developed at both of these terminals when all three input terminals are pulsed coincidently. Referring to Fig. 5, the operation of the novel binary adder in carrying out the logical function necessary to produce the required outputs will now be described.

As shown in that figure the input terminal 30X is connected to the input winding 14A and the input 30Y is connected to the input winding 12A of magnetic element 10A. The input windings 12B and 14B on element 10B are connected respectively to the input terminal 30C and to the sum output winding 18A on element 10A. The application of a positive pulse to either one of the terminals 30X or 30Y, in a manner previously explained, causes an output to be developed on the "sum output" winding, which winding is designated 18A, and no appreciable output to be developed on the carry output winding for the element, which winding is designated 16A. The "sum output" winding 18A is connected through a full wave rectifier and a gating circuit 34 to one of the input windings 14B for the other magnetic element designated 10B. The full wave rectifier is a parallel arrangement of a pair of rectifiers 36 connected to the outer ends of winding 18A and a grounded resistor 38 connected to a center tap on that winding. The rectifiers 36 allow current to pass in only one direction in either of the outer legs, and ensure that the current flow in the middle leg is always in the same direction. Thus, regardless of the direction of flux change effected in the portion of the magnetic element embraced by winding 18A, the current flow through resistor 38 is in the same direction and the pulse developed at a terminal 40 is negative. This pulse is applied to one input of gate 34, the other input of which is in the form of a negative clock pulse applied from a clock pulse source, designated 42. The clock pulse is applied during the same time interval as the input pulses and its function is to open gate 42 during that time to allow the output developed as a result of the application of an input pulse to cause a positive pulse to be transmitted to winding 14B and to prevent the outputs developed upon the termination of the input pulses (see Figs. 3A, 3B, 3C) from causing an energization of that winding.

Thus, when an input pulse is applied to either terminal 30X or 30Y, input winding 14B on element 10B is energized and where no pulse is applied to terminal 30C, the energization of winding 14B is effective to produce an output at the sum output terminal for the system which terminal is designated 32S. Similarly, if neither of the input terminals 30X or 30Y is pulsed and terminal 30C is pulsed, the winding 12B on element 10B is energized and an output is produced at terminal 32S. When either terminal 30Y or 30X is pulsed coincidently with terminal 30C both windings 14B and 12B are energized and no output is developed at terminal 32S and an output is induced on winding 16B which output is transmitted through an Or circuit designated 44 to the carry output terminal 32C. When terminals 30X and 30Y are pulsed coincidently, a similar output is induced in winding 16A on element 10A which output is transmitted through Or circuit 44 to carry output terminal 32C. When all three terminals are pulsed simultaneously, an output is induced on winding 16A and manifested at terminal 32C and since only winding 12B on element 10B is then energized, an output is induced on winding 18B which output is manifested at terminal 32S.

Though in the description given above the novel logical circuitry of the subject invention the input signals applied have been in the form of D. C. pulses, it should here be pointed out that the inputs in either of the embodiments may be in the form of properly phased A. C. signals applied to the various input terminals. For example, the batteries 30 shown in Fig. 1 may be replaced by generators capable of supplying A. C. signals and the operation of the circuitry is the same with the exception that the output developed at either terminal 20 or 22 is in the form of an A. C. signal which is manifested continuously as long as the inputs are applied to the windings 12 and 14.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A logical circuit comprising an element having a plurality of magnetic circuit paths, a first input winding for applying magnetomotive force to a first and a second one of said paths, said first and second paths having portions in parallel magnetic circuit relationship with respect to said first winding, said portion of said second path having a greater reluctance than said portion of said first path with which it is in parallel, a second input winding for applying magnetomotive force to said first and a third one of said paths, said first and third paths having portions in parallel magnetic circuit relationship, said portion of said third path having a greater reluctance than the portion of said first path with which it is in parallel, a first output winding embracing a portion of said first path, and a second output winding embracing a portion of said second path and a portion of said third path.

2. The invention as claimed in claim 1 wherein said second and third paths have a portion common to both paths, and said second output winding embraces said common portion.

3. The invention as claimed in claim 2 wherein the reluctance of said second path is substantially equal to the reluctance of said third path.

4. A logical circuit comprising an element having a plurality of portions of magnetic material forming at least a first, a second and a third magnetic flux path; a first winding embracing one of said portions which forms a part of both said first and second flux paths, a second winding embracing one of said portions which forms a part of both said first and said third flux paths, a third winding embracing one of said portions which forms a part of said first flux path, and a fourth winding embracing one of said portions which forms a part of both said second and said third flux paths.

5. The invention as claimed in claim 4 wherein said first and second windings are input windings for selectively applying magnetomotive forces to said magnetic flux paths and said third and fourth windings are output windings for manifesting outputs in accordance with the magnetomotive forces applied by said input windings.

6. The invention as claimed in claim 5 wherein the reluctance of each of said second and third flux paths is greater than the reluctance of said first flux path.

7. The invention as claimed in claim 5 wherein the reluctance of said second flux path is substantially equal to the reluctance of said third flux path.

8. The invention as claimed in claim 7 wherein the length of said second flux path is equal to the length of said third flux path and the length of each of said second and third flux paths is greater than the length of said first flux path.

9. A logical circuit comprising an element having a plurality of segments of magnetic material which form at least a first, a second and a third magnetic flux path, a first one of said segments being common to said first and said second paths, a second one of said segments being common to said first and said third paths, a third one of said segments being common to said second and said third paths, a first input winding embracing said first segment, a second input winding embracing said second segment, a first output winding embracing a fourth one of said segments which forms part of said first path but which is not part of either said second or said third path, a second output winding embracing said third segment, and means for selectively energizing said input windings, said first and second input windings being effective when energized to apply magnetomotive forces in opposite directions to said fourth segment in said first flux path and in the same direction to said third segment common to said second and third flux paths.

10. A logical circuit comprising an element having a plurality of segments of magnetic material which form at least a first, a second and a third flux path; the reluctance of said second path being substantially equal to the reluctance of said third path and greater than the reluctance of said first path, a first one of said segments being common to said first and second paths, a second one of said segments being common to said first and third paths, a third one of said segments being common to said second and third paths, a fourth one of said segments being part of said first path and not being part of either said second or third path, a first input winding embracing said first segment, a second input winding embracing said second segment, said first and second input windings being effective when energized to apply magnetomotive forces in opposite directions to said fourth segment in said first path and in the same direction to said third segment common to said second and third paths, means for selectively energizing said first and second input windings, a first output winding embracing said fourth segment for manifesting an output when either of said input windings is energized exclusively, and a second output winding embracing said third segment for manifesting an output when both of said input windings are energized coincidently.

11. A logical circuit comprising a magnetic element having at least first, second and third flux paths; each of said paths having a portion common to one of the remainder of said paths and a portion common to the other of the remainder of said paths and each having a portion in parallel magnetic circuit relationship to a portion of one of the remainder of said paths and a portion in parallel magnetic circuit relationship to a portion of the other of the remainder of said paths, a first input winding embracing the common portion of said first and second paths, a second input winding embracing the common portion of said first and third paths, circuit means associated with said first winding for applying electric signals thereto to thereby apply magnetomotive force to said parallel portions of said first and second paths, further circuit means associated with said second winding for applying electric signals thereto to thereby apply magnetomotive force to the said parallel portions of said first and third paths, said first and second windings being wound in an opposite sense with respect to said first path and in the same sense with respect to the portion common to said second and third paths whereby the impedance offered by each of said windings to signals applied by their associated circuit means is less when electric signals of like polarity are applied to both of said windings simultaneously than when a signal is applied to one of said windings exclusively, and an output winding embracing said portion common to said second and third paths.

12. A logical circuit comprising an element having a plurality of portions forming at least first, second and third magnetic circuits, a first one of said portions being common to said first and second circuits, the remaining portions of said first circuit and the remaining portions of said second circuit being in parallel magnetic circuit relationship with respect to said portion common to both said circuits, a first input winding embracing one of said remaining portions of said first circuit, a second input winding embracing one of said remaining portions of said second circuit, and an output winding embracing said portion common to both said circuits, said third magnetic circuit including the portions of said first and second magnetic circuits embraced by said first and second imput windings, respectively, and including a further portion which is part of neither said first nor said second magnetic circuit.

13. A logical circuit comprising an element having a plurality of portions forming at least first, second and third magnetic circuits, a first one of said portions being common to said first and second circuits, the remaining portions of said first circuit and the remaining portions of said second circuit being in parallel magnetic circuit relationship with respect to said portion common to both said circuits, a first input winding embracing one of said remaining portions of said first circuit, a second input winding embracing one of said remaining portions of said second circuit, and an output winding embracing said portion common to both said circuits, said third magnetic circuit including the portions of said first and second magnetic circuits embraced by said input windings, respectively, and including a further portion which is part of neither said first nor said second magnetic circuit, said first and second windings being wound in opposite senses with respect to said further portion of said third magnetic circuit and in the same sense with respect to said portion common to said first and second magnetic circuits.

14. A binary half adder circuit comprising an element of magnetic material having first, second and third openings therein dividing said element into first, second and third flux paths, first input means to said binary half adder circuit comprising a first winding threaded through at least one of said openings to embrace a portion of said material common to said first and second flux paths, second input means to said half adder circuit comprising a second winding threaded through at least one of said openings to embrace a portion of said material common to said first and third flux paths, a sum output winding threaded through at least one of said openings to embrace a portion of said first flux path, and a carry output winding threaded through at least one of said openings to embrace a portion of said element common to said second and third flux paths.

15. A binary half adder circuit comprising an element of magnetic material having first, second and third openings therein dividing said element into first, second and third flux paths, first input means to said binary half adder circuit comprising a first winding threaded through at least one of said openings to embrace a portion of said material common to said first and second flux paths, second input means to said half adder circuit comprising a second winding threaded through at least one of said openings to embrace a portion of said material common to said first and third flux paths, the reluctance of said second flux path being substantially equal to that of said third said flux path and greater than the reluctance of said first flux path, a sum output winding threaded through at least one of said openings to embrace a portion of said first flux path, and a carry output winding threaded through at least one of said openings to embrace a portion of said element common to said second and third flux paths.

16. A binary half adder circuit comprising an element of magnetic material having first, second and third openings therein, first input means to said binary half adder circuit comprising a first winding threaded through at least one of said openings to link a first portion of said element, second input means to said circuit comprising a second input winding threaded through at least one of said openings to link a second portion of said element, said first and second windings being effective when one or the other is energized exclusively to produce a flux change in a third portion of said element indicative of said exclusive energization and effective when energized coincidently to produce a flux change in a fourth portion of said element indicative of said coincident energization, a sum output winding linking said third portion of said element, and a carry input winding linking said fourth portion of said element.

17. A binary half adder circuit comprising an element of magnetic material having first, second and third openings therein, first input means to said binary half adder circuit comprising a first winding threaded through at least one of said openings to link a first portion of said element, second input means to said binary half adder circuit comprising a second input winding threaded through at least one of said openings to link a second portion of said element, means for energizing said input windings, said first and second input windings being effective when energized to apply magnetomotive forces in opposite directions to a third portion of said element and in the same direction to a fourth portion of said element, a sum output winding linking said third portion of said element for manifesting outputs indicative of exclusive energization of one or the other of said windings, and a carry output winding linking said fourth portion of said element for manifesting outputs indicative of coincident energization of said input windings.

References Cited in the file of this patent

UNITED STATES PATENTS

| | | |
|---|---|---|
| 2,295,373 | Wickerham | Sept. 8, 1942 |
| 2,694,521 | Newman et al. | Nov. 16, 1954 |

FOREIGN PATENTS

| | | |
|---|---|---|
| 381,785 | Great Britain | Oct. 13, 1932 |
| 881,089 | Germany | June 25, 1953 |

Notice of Adverse Decision in Interference

In Interference No. 90,836 involving Patent No. 2,868,451, E. W. Bauer, Magnetic core half adder, final judgment adverse to the patentee was rendered Aug. 30, 1962, as to claim 4.

[*Official Gazette December 4, 1962.*]